(12) United States Patent
Williamson

(10) Patent No.: US 8,474,993 B2
(45) Date of Patent: Jul. 2, 2013

(54) STORM DOOR AND ENTRANCE DOOR HARDWARE ILLUMINATION SYSTEM

(76) Inventor: John R Williamson, Burnsville, MN (US)

(*) Notice: Subject to any disclaimer, the term of this patent is extended or adjusted under 35 U.S.C. 154(b) by 352 days.

(21) Appl. No.: 12/797,785

(22) Filed: Jun. 10, 2010

(65) Prior Publication Data
US 2010/0315008 A1 Dec. 16, 2010

Related U.S. Application Data

(60) Provisional application No. 61/268,310, filed on Jun. 11, 2009.

(51) Int. Cl.
*E05B 17/10* (2006.01)

(52) U.S. Cl.
USPC ........... 362/100; 362/183; 362/234; 362/276; 362/802

(58) Field of Classification Search
USPC ................ 362/94, 100, 183, 234, 253, 276, 362/802
See application file for complete search history.

(56) References Cited

U.S. PATENT DOCUMENTS 4,872,095 A * 10/1989 Dubak et al. .............. 362/100
6,402,338 B1 * 6/2002 Mitzel et al. .............. 362/276

* cited by examiner

*Primary Examiner* — Stephen F Husar
(74) *Attorney, Agent, or Firm* — Roger Belfay

(57) ABSTRACT

Certain people may at times find that life events cause absences from their residence. Due to the configuration of a residence entrance there are times of darkness when there is low or no ambient light to illuminate the entrance door hardware. Some people would not leave their porch light on for several hours. Some people may be uncomfortable with leaving the standard porch light on during their absence to avoid the expense of the utility power used by the lighting. A situation for the need to illuminate the hardware may include the unexpected prolonged time of being away from home. The present invention is a sustainable option to illuminate the storm door and exterior entrance door of a residence. This invention provides illumination of the doors hardware on demand.

2 Claims, 4 Drawing Sheets

STORM DOOR AND ENTRANCE DOOR HARDWARE ILLUMINATION SYSTEM

CROSS REFERENCE TO RELATED PATENTS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention is in the technical field of storm door hardware. More particularly, the present invention is in the field of a self contained automatic solar powered illumination system for the exterior storm door entrance hardware and exterior entrance door hardware.

Certain individuals at times are required to return to their home after dark. These individuals are not able to/or uncomfortable with leaving a porch light on during an extended absence due to the cost of utility power. The present invention provides an automated light source that illuminates the exterior door and the entrance door hardware without utility power.

BRIEF SUMMARY OF THE INVENTION

The present invention is a storm door mounted device that senses the presence of a person at the entrance then illuminates the exterior storm door hardware and the entrance door of building when the storm door is opened.

The device control system senses daylight and darkness to prevent untimely operations of the illumination. The invention is self recharging and is not connected to utility power.

DETAILED DESCRIPTION OF THE INVENTION

Figure 1:
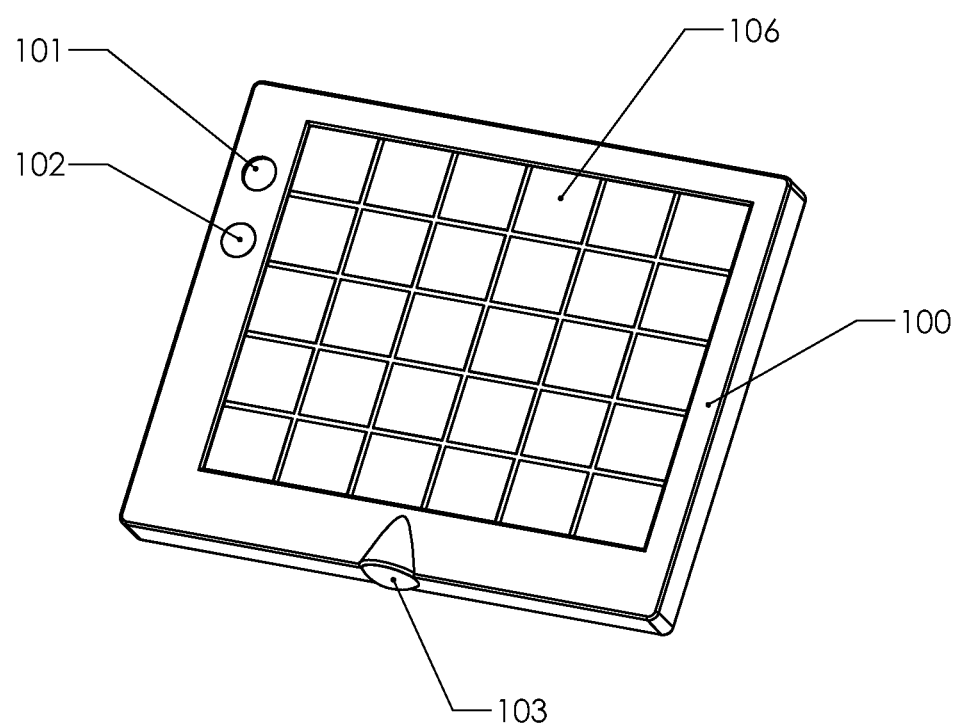
FIG. 1 is a perspective view of the exterior component 100. The exterior component contains a solar collector 106, and control devices including, but not limited to a proximity motion detector 102, a light sensor 101 and a LED light 103.
Figure 3:
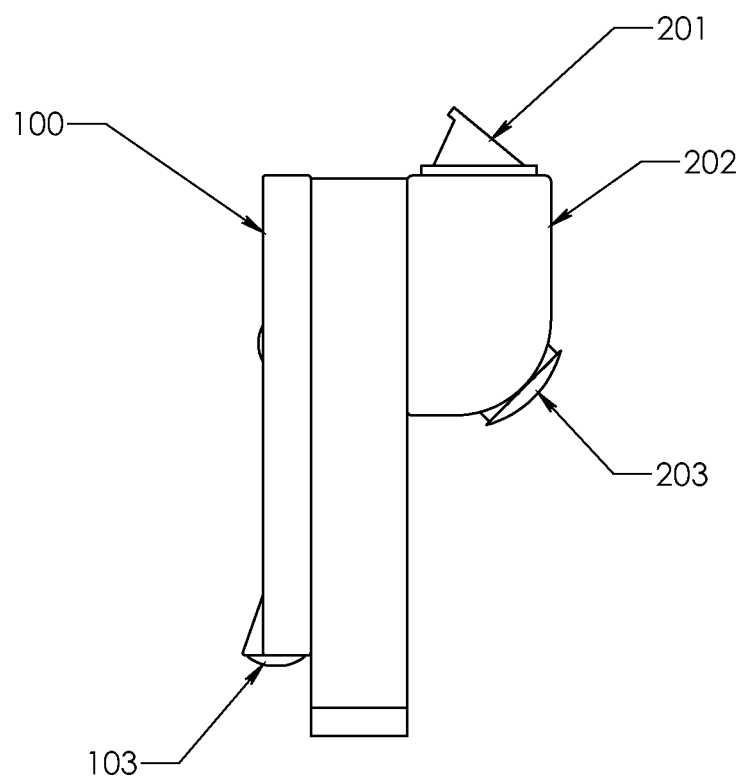
FIG. 3 is a perspective view of the mounting of the present invention on the storm door. The connection of the exterior 100 and interior 202 components provides a conduit for the wiring.

Referring to the invention in more detail of FIG. 1 and FIG. 3 there is shown an exterior storm door weatherproof component integral or mounted on the top front of the storm door, a photovoltaic cell solar collector within a frame that includes control devices that include but are not limited to a motion/proximity sensor 101, a light sensing photo cell 101 device and a light emitting diode (LED) assembly 103 which may include magnification lens.

Figure 2:
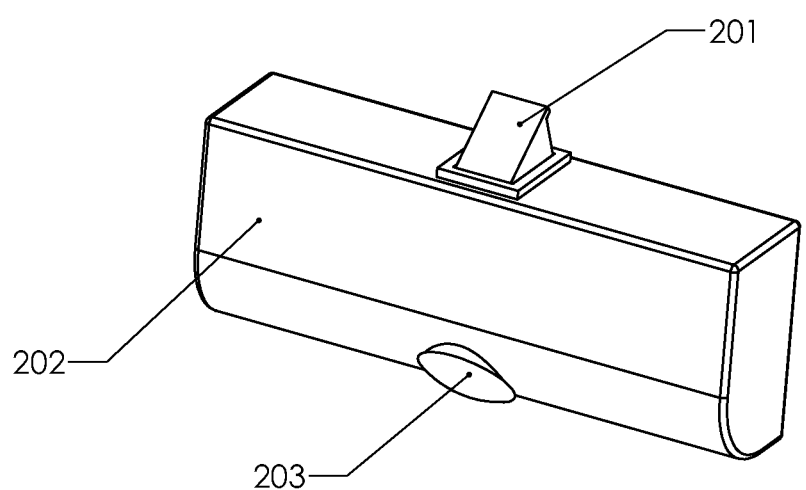
FIG. 2 is a perspective view of the interior component. The interior component includes the rechargeable batteries, circuit board, LED lamp 203, door switch 201.

Referring to the invention is shown in FIG. 2 the interior housing 202 component which is mounted or integral to inside top of the storm door. The housing which includes the LED assembly 203 which provides illumination of the exterior entrance door handle and lock hardware. The housing also includes the containment of the rechargeable battery and electrical circuits. The interior housing component may include a door contact switch 201 which initiates the operation of the interior LED assembly 203. This door contact switch may be mounted on the interior housing component or may be otherwise a switch which maybe an integral part of the storm door hinge or storm door jamb.

In further detail, still referring to the invention shown in FIG. 1 is a frame 100 that is constructed from a material that provides rigidity and strength sufficient to secure the solar collector, and control components in the desired position.

Figure 4:
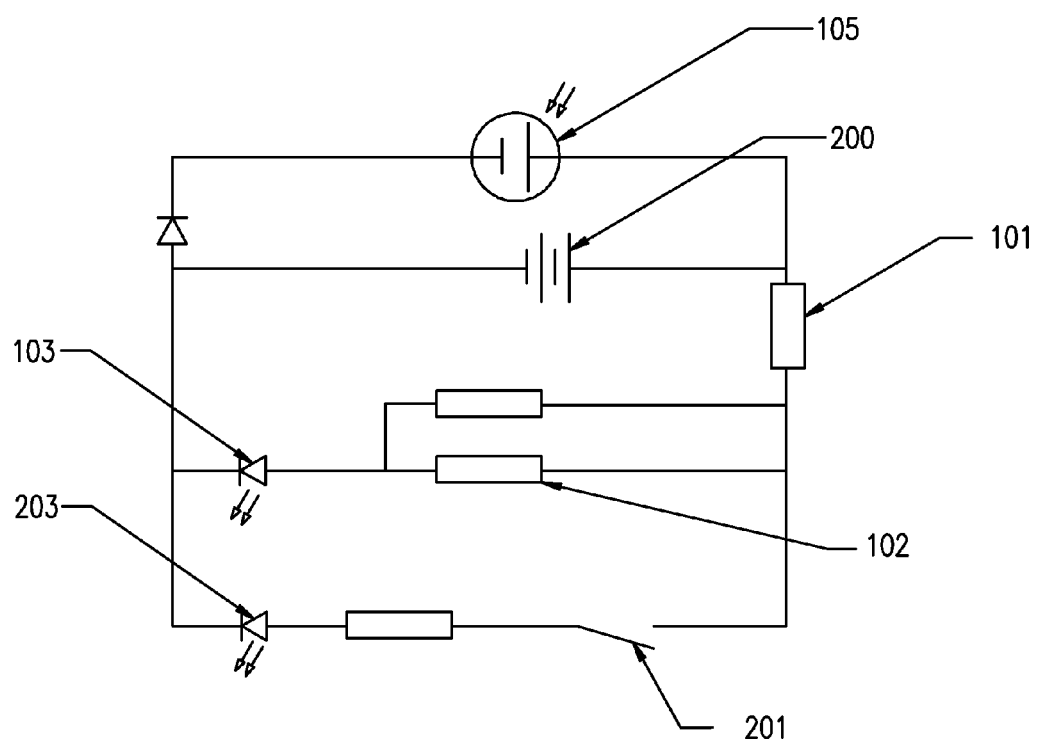
FIG. 4 is schematic wiring diagram of the invention circuitry.

In referring to the invention in more detail of FIG. 1 and FIG. 4 is shown, a photo cell light sensor 106. The photo cell light sensor is configured such that it provides the switching of the operation of the invention during only periods of darkness.

In more detail, still referring to the invention of FIG. 1 and FIG. 4 shows a motion sensor 102 that initiates operation of the exterior LED 103

In more detail, still referring to the invention of FIG. 1 and FIG. 4 shows a LED 103 which illuminates the storm door exterior handle and or lock assembly. The illumination from this LED 103 is appropriately concentrated on the storm door handle.

In further detail, still referring to the invention shown in FIG. 1 and FIG. 4 is shown a LED 103 with a magnifying lens that directs the light onto the exterior handle of the storm door.

In more detail of FIG. 1 and FIG. 4 is shown a photovoltaic solar cell 106 that converts solar energy to potential energy for the storage batteries 200 of the present invention.

In further detail of FIG. 2 is shown the interior housing component that is constructed polymer material or a material of sufficient strength to support and enclose the rechargeable batteries 200 electrical circuits, the door switch 201, and the interior LED light assembly 203.

In further detail of FIG. 2 is the interior housing 202 which provides a nipple for the conductor conduit which provides a pathway for the electrical conducts between exterior and interior components.

In further detail of the invention of detail FIG. 3 is shown the location of the components as mounted to the storm door. The location as shown provides the over the shoulder directional clearance of the user to illuminate the exterior door hardware.

In detail of the invention in FIG. 4 is the schematic diagram of the circuitry of the invention where is shown the control devices. The control devices may include self contained or integral circuitry such as a light sensor 101, a proximity sensor 102 and various other circuitries of other exterior control devices. The present invention circuitry will include the photovoltaic cell solar collector 106 and the exterior LED 103.

The detail of FIG. 4 also includes the schematic diagram of the circuitry for the interior component elements including rechargeable batteries 200 the interior LED assembly 203 and door contact switch 201.

The construction details of the invention shown in FIG. 1, FIG. 2, FIG. 3 and FIG. 4 provide that the exterior component frame provides the support to secure and conceal the exterior components in the required place to facilitate the required function of the components. The interior component is constructed of formed polymer of other material of sufficient strength to facilitate mounting of the interior component to the storm door. The interior component has with in it certain adjunctive supports that form LED assembly retainers, the battery container and wiring retainers.

The advantages of the present invention include the convenience of sustainable illumination of the door hardware including the door handles, locks and latching devices of the storm door and the exterior entrance door. The advantages include the elimination of the need for the user to expend energy with the standard utility powered porch lights during periods of being away from home. The present invention offers automatic lighting of the entrance upon return. The present invention maybe made an integral part of the storm door or externally added to the standard storm door.

The present invention is constructed of components of mainly of prior art and commercially available including a collect solar collector and circuit to efficiently recharge batteries and LED assemblies to illuminate the hardware of the storm and exterior doors of user's home. The present invention includes commercially available electrical circuitry components that provide control of the use and operation of the current invention.

The storm door and entrance door hardware illumination system comprises: a first sensor 101; a light source; and a light sensor configured to prevent the interior and exterior light source 103s from being energized during periods when the light sensor is illuminated. The storm door and entrance door hardware illumination system may further comprise a battery 200 and said battery 200 may be rechargeable. The storm door and entrance door hardware illumination system may also comprise a photovoltaic cell solar collector 106 for recharging the battery 200.

The first sensor 101 may be a motion sensor 102 configured to energize the interior light source 103 when motion is detected, a paddle switch 201 to detect changes in the state of the entrance door or storm door, or any other device which serves to indicate that illumination is required. Said motion sensor 102 may be a short range motion sensor 102.

The interior light source 103 may be a Light Emitting Diode (LED) array. A lens may be used to focus the light from the interior light source 103.

The exterior light source 103 may be a Light Emitting Diode (LED) array. A lens may be used to focus the light from the exterior light source 103.

SEQUENCE LISTINGS

Not Applicable

I claim:

1. A storm door and entrance door hardware illumination system comprising:
   a) a first sensor;
   b) a light source configured to be energized by said first sensor;
   c) an interior light source configured to be energized when said storm door is opened;
   d) wherein the light source configured to be energized by said first sensor is an exterior light source;
   e) a light sensor configured to prevent said interior and said exterior light sources from being energized during periods when the light sensor is illuminated, said exterior light source positioned to illuminate a handle region of said storm door.

2. The illumination system of claim 1 wherein said interior light source is positioned to illuminate a handle region of an entrance door.

* * * * *